Jan. 19, 1965   K. REHM   3,166,312
CONVEYING DEVICE
Filed April 26, 1963   5 Sheets-Sheet 1

INVENTOR
Karl Rehm
BY Spencer & Kaye
ATTORNEYS

Jan. 19, 1965     K. REHM     3,166,312
CONVEYING DEVICE
Filed April 26, 1963     5 Sheets-Sheet 2
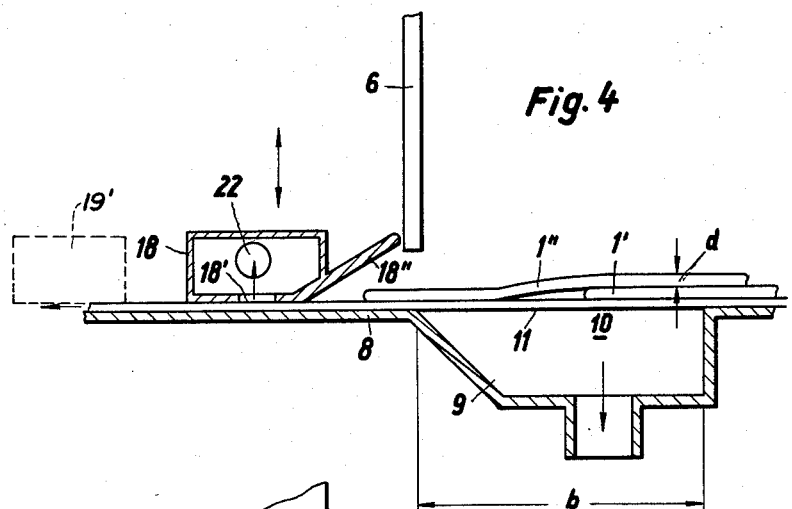
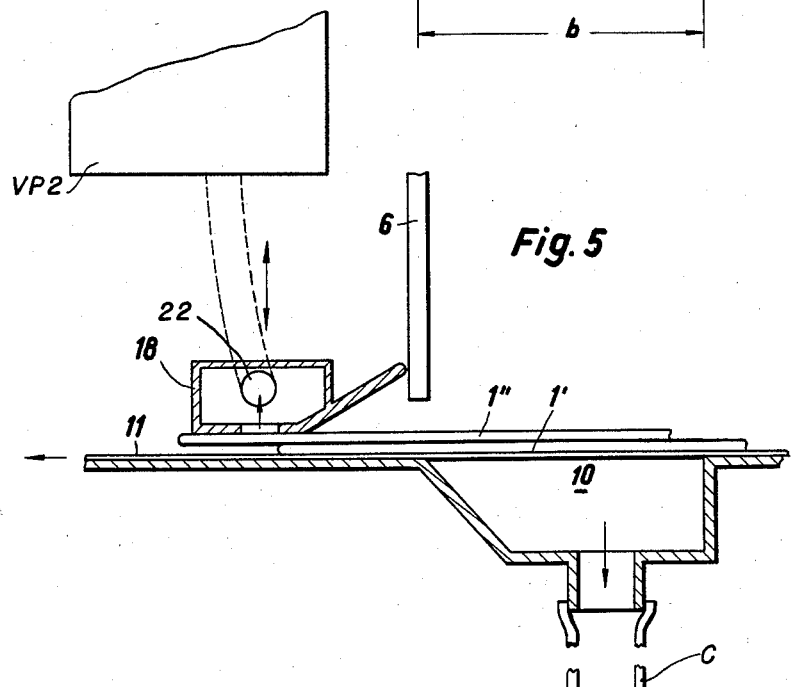
INVENTOR
Karl Rehm
BY *Spencer & Kaye*
ATTORNEYS

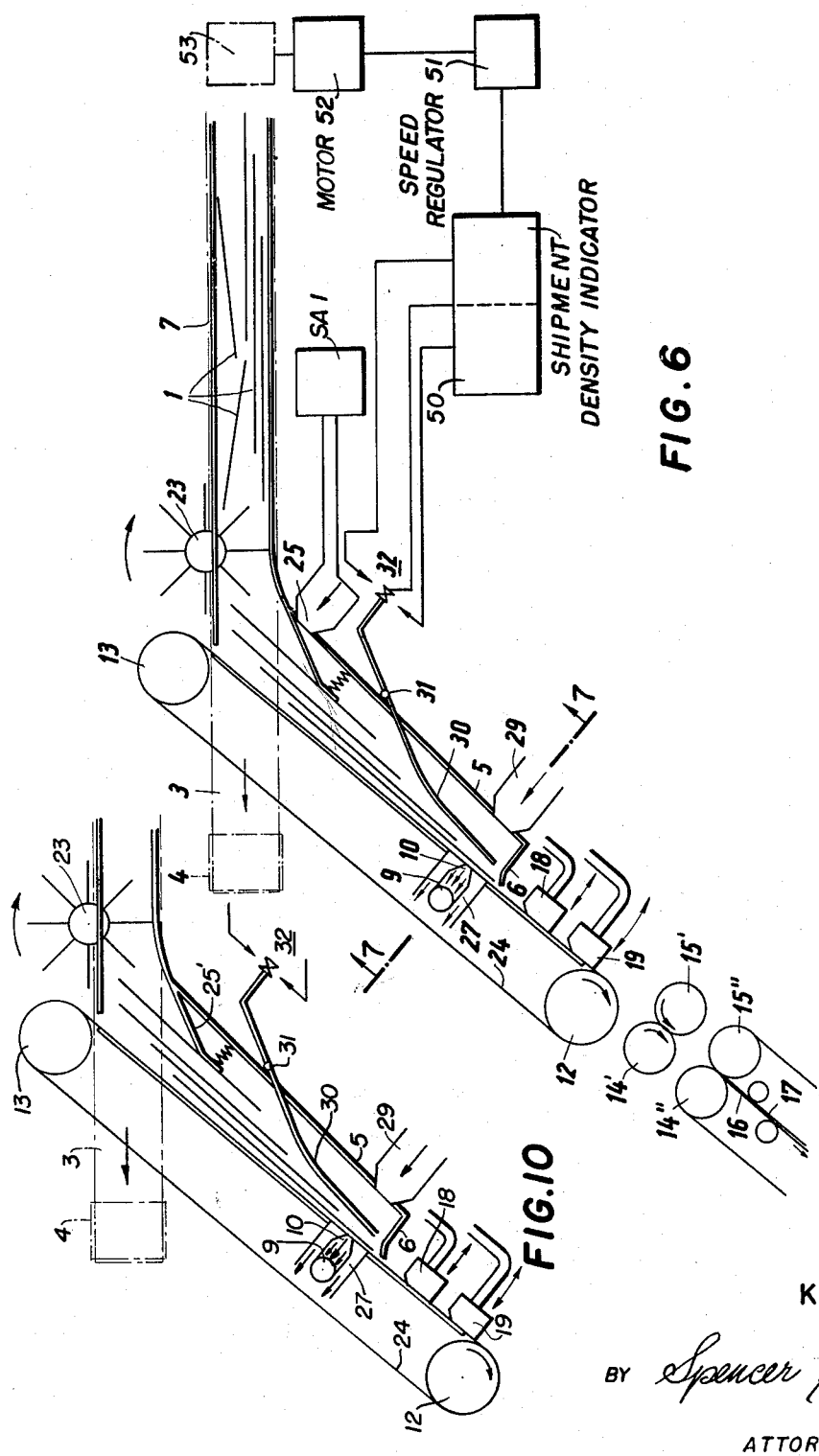

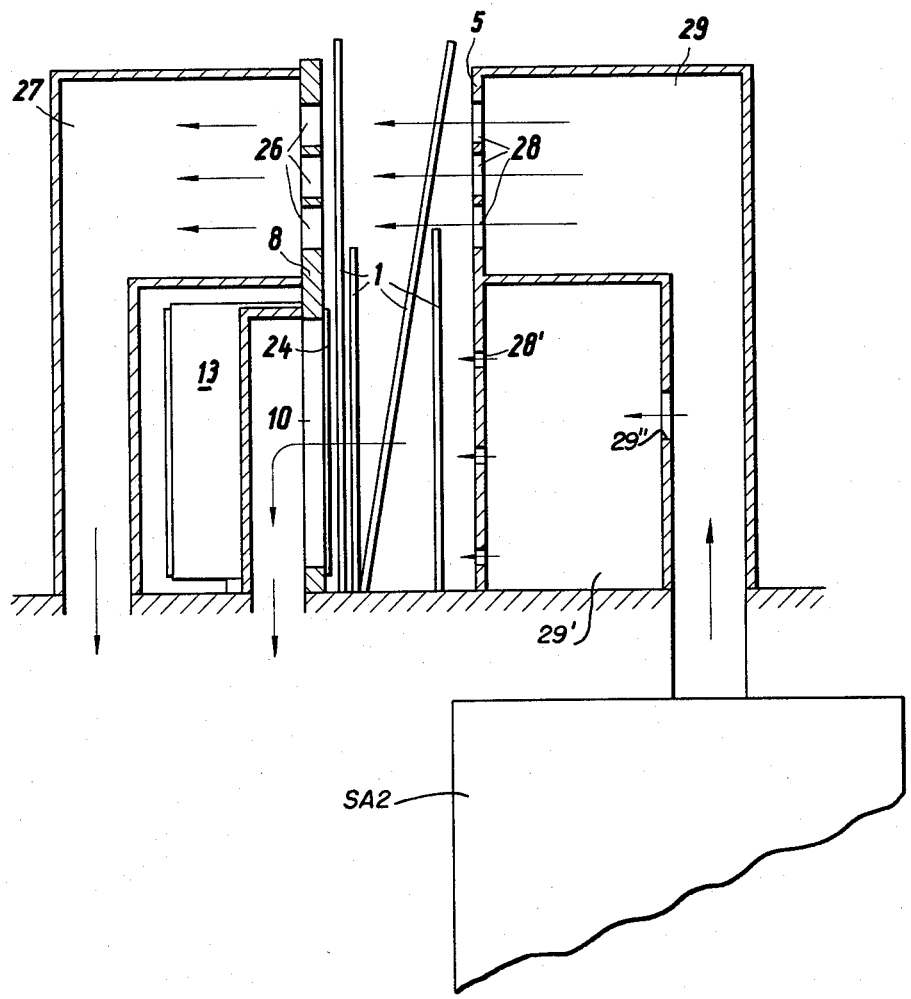

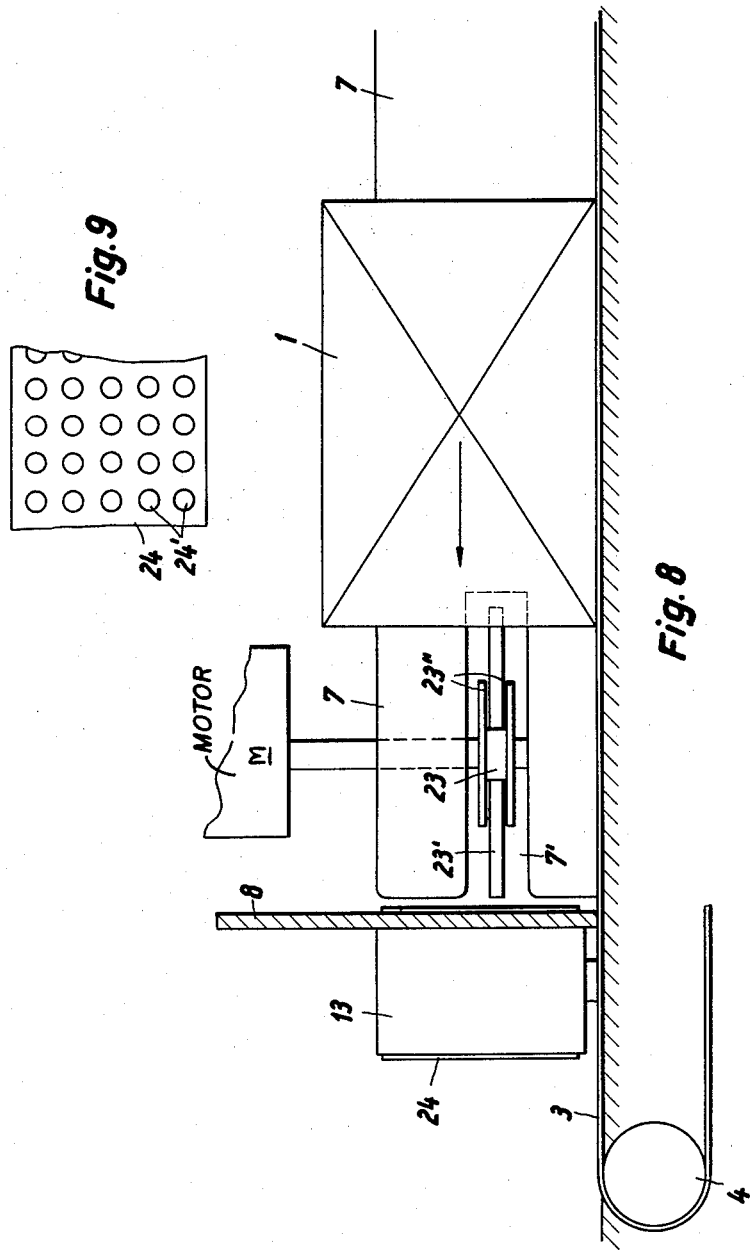

United States Patent Office 3,166,312
Patented Jan. 19, 1965

3,166,312
CONVEYING DEVICE
Karl Rehm, Konstanz (Bodensee), Germany, assignor to Telefunken Patentverwertungs-G.m.b.H., Ulm (Danube), Germany
Filed Apr. 26, 1963, Ser. No. 275,818
Claims priority, application Germany, Apr. 28, 1962
20 Claims. (Cl. 271—32)

The present invention relates generally to the art of automatic processing of flat shipments, such as mail shipments, and, more particularly, to a device for arranging shipments, which are fed irregularly from a conveying path transporting the shipments on edge several at a time or overlapped in any conceivable manner, to be discharged in a one-by-one manner or at least in a definite successive manner.

Devices are already known for separating articles into single form and these operate in a dependable manner only if the shipments are first stacked in such a manner that their leading edges are in as exact a position as is possible. Since this condition can not be fulfilled because of the simultaneous arrival of shipments or because of unfavorable overlapping thereof and particularly when "raw mail" including shipments which differ considerably from each other are being handled, these separators are unsuitable for present purposes.

Attempts have been made in the past to solve this problem by using continuous flow separators or transit separators wherein an initial exact stacking is not used. A known transit separator, for example, is constructed with a chamber-like conveying path section which follows a feeding path. The input breadth of the conveying path is substantially larger than its discharge breadth, a suction port is located in one of the side walls of this conveying path section, and the port is connected with a low pressure chamber. A suction belt is provided with suction openings and moves over this port and the belt is driven continuously. However, such a device can not satisfy the requirements desired because several shipments can clog or jam together at the discharge end of the conveying path section, and particularly because the shipments which arrive several at a time or overlapping one another in an unfavorable manner are seldom passed or separated from one another.

With these defects of the prior art in mind it is a main object of the present invention to provide a transit separator providing reliable separation of shipments even when there is simultaneous arrival thereof or unfavorable overlapping of the shipments, and this reliable separation is provided independently of the condition of the shipments arriving.

Another object of the present invention is to provide a device of the character described wherein a predetermined distance is automtically maintained between the trailing edge of the preceding shipment and the leading of the succeeding shipment.

These objects and others ancillary thereto are accomplished according to preferred embodiments of the present invention wherein a suction conveying element is provided such as a suction drum or preferably a suction conveying belt having suction openings therein extending over a suction port in one of the side walls of the conveying path. These openings are not combined into groups but are distributed, in a manner known per se, uniformly over the entire periphery of the conveying path section. A discharge conveying means is provided at a distance from the suction port and this distance is smaller than the length of the smallest shipment to be processed. This conveying means seizes the leading edges of the individual shipments pushed forward by the suction conveying element and moves them along at uniform speed to the outlet or discharge conveying channel. Between the suction port and the discharge conveying means, one or more stripping elements are provided for holding back any shipments which are carried along simultaneously with the one to be discharged. Also, the length of this suction port when measured in the conveying direction is sufficiently small that it approximately satisfies the condition that its length is less than fifteen times the thickness of the thinnest shipment to be processed times a number which is one larger than the number of multiple-arranged shipments which can be held back simultaneously by the stripping elements.

The present invention provides particular advantages in those situations wherein, for further processing irregularly fed shipments, no exact separation with mutual distances between the shipments is necessary. For example, with the present invention trouble-free operation can be maintained. However, in those cases when there is the necessity for providing an exact separation between the mutual distance between the shipments, the present invention will then preferably be so constructed that the discharge conveying means which follows the suction port accelerates the respective shipments seized thereby to a conveying speed which is substantially greater than the speed of the suction conveying element. In this event, it is preferably to arrange the suction port so that it is not longer than ten times the thickness of the thinnest shipment to be processed times an integer which is one more than the number of overlapping shipments which may be handled by the stripping device.

Additional objects and advantages of the present invention will become apparent upon consideration of the following description when taken in conjunction with the accompanying drawings in which:

FIGURE 4 is an enlarged and partial sectional view illustrating the suction port and a first stripping device in one phase of operation of the device.

FIGURE 5 is an enlarged and partial sectional view similar to FIGURE 4, illustrating another phase of operation.

FIGURE 6 is a schematic plan view of a second embodiment of the invention.

FIGURE 7 is a sectional view taken substantially along the plane defined by reference line 7—7 of FIGURE 6, but on an enlarged scale.

FIGURE 8 is an enlarged side view of the feeding conveying path illustrated in FIGURE 1.

FIGURE 9 is a fragmentary view illustrating a section of the suction conveying belt.

FIGURE 10 is a schematic plan view similar to FIGURE 6 but showing a different type of deflecting element.

Figure 2:
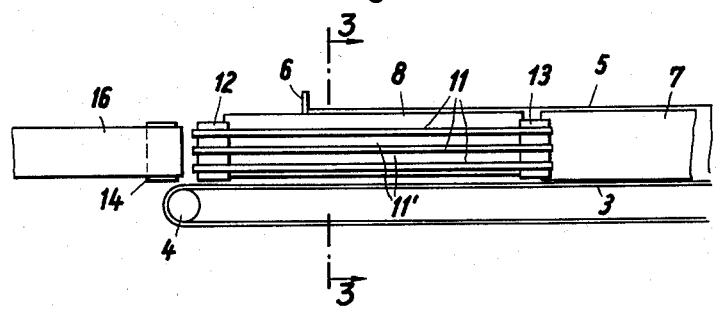
FIGURE 2 is a schematic side view of the arrangement illustrated in FIGURE 1.
Figure 1:
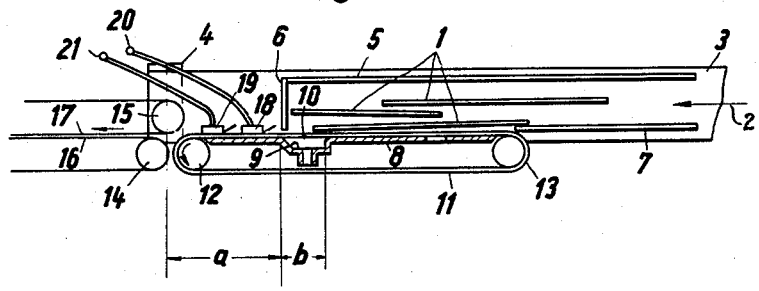
FIGURE 1 is a schematic plan view partially in section of a first embodiment of the present invention.
Figure 3:
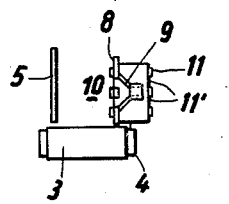
FIGURE 3 is a vertical sectional view taken substantially along the plane defined by reference line 3—3 of FIGURE 2.

With more particular reference to the drawings, FIGURES 1 through 3 illustrate an embodiment of a transit separator wherein shipments 1 are fed by means of a horizontal conveying belt 3, driven in the direction of arrow 2. This conveying belt 3 has a guide or idler roller 4. The irregularly fed shipments enter a conveying path section before they are separated, and this conveying path section is limited on the right-hand side by a wall 5 and in front by a wall 6, considered in the conveying direction. A wall 8 is arranged on the left side of the conveying path section and follows a guide surface 7. A suction port 10 is formed in the wall 8 and is in communication with a low pressure chamber 9. This low pressure chamber is connected, in a manner known per se, to a source of vacuum pressure VP1 by means of a conduit C. A conveying belt 11 runs over the front of the suction port and the wall 8 and this belt includes three parallel guided single belts having drive and guide or idler rollers 12 and 13, respectively. The surface of the conveying belts, at least on the side facing the shipments, has a relatively high coefficient of friction.

Suction openings 11' are formed or defined by the spaces between the three single belts, and these suction openings extend uniformly over the entire periphery of the suction conveying belt 11. Up to now such a construction in separators could only be found in those which are different from the present invention in that they are designed only for overlapped stripping.

Rollers 14 and 15 of a discharge conveying belt pair 16 and 17 turn with uniform speed and are disposed at a distance $a$ from the suction port 10, this distance $a$ being smaller than the length of the shortest shipments to be processed. Two vacuum strippers 18 and 19 are arranged one behind the other in the conveying direction, and they are disposed in the area between the suction port 10 and rollers 14 and 15. These strippers are pivotally mounted about shafts 20 and 21, and are yieldably biased toward the conveying belt 11, each under the influence of a relatively small tension force. They are constructed as shoes which are provided with respectively one small hollow space which is connected with a source of vacuum pressure VP2 via a line 22, and this is illustrated schematically in FIGURES 4 and 5 wherein only the stripper 18 is shown. The surface which faces the conveying belt 11 has an opening 18' therein, and the portion of this surface which faces the oncoming shipments is provided with an inclined charging section 18".

The suction force which is present at the opening 18' is such that the frictional force between the stripper and a shipment which is in the vicinity of the opening is larger than the frictional force between this shipment and a further shipment lying underneath, but smaller than the holding force between the conveying belt 11 and a shipment at the suction port 10 and lying directly against belt 11. Such strippers which are useful for holding back multiple-stacked shipments have already been proposed in co-pending application Serial No. 123,000 filed July 10th, 1961, now Patent No. 3,126,201 and thus such a stripper does not per se comprise the subject of the present invention. However, the special mode of operation of such a stripper as used in connection with the present invention will be explained in detail below. In order to further improve the function of such strippers, they could be supplemented by one or more air-blast strippers 19' which have been proposed previously as, for example, the type disclosed in co-pending Application Ser. No. 127,061, filed July 26th, 1961 now Patent 3,126,200.

The length $b$ of the suction port 10 in the conveying direction is, in accordance with the invention, arranged so that it is smaller than $15 \cdot d \cdot (n+1)$. If the thickness $d$ of the thinnest shipment to be processed, which corresponds to the thickness of postcards, may be assumed to be approximately 0.2 mm., and if, as in the example proposed above, at least two multiple-stacked shipments can be held back by stripping elements 18 and 19 (so that $n=2$), then a value is provided for length $b$ which is smaller than $15 \cdot 0.2 \cdot (2+1)$ which equals 9 mm. For purposes of clarity, the length $b$ is not illustrated in proper scale in FIGURES 1, 4 and 5, although its relationship to the thickness $d$ illustrated corresponds approximately to the above-mentioned condition.

Shipments 1 which are fed by the feeding conveying path arrive via feed conveying belt 3 at the conveying path section generally defined by the walls 5, 6 and 7, and thus with the cooperation of belt 11 they arrive at the area of suction port 10. At this port, they are sucked onto the conveying belt 11 and are pushed forward against the retarding or arresting force of strippers 18 and 19 so that their leading edges are pushed as far forwardly as rollers 14 and 15. Their leading edges are then gripped by rollers 14 and 15 and they are guided between discharge conveying belts 16 and 17 and are moved on for further processing.

The difficulty that exists when separating shipments without previously stacking them is caused, among other reasons, by the fact that the irregularly fed shipments may also arrive simultaneously or in an overlapping arrangement so that at the suction port two or more shipments may be held together by this suction force so that they are stripped off simultaneously. In FIGURE 4, the length $b$ of suction port 10 is of such a length that basically two or three overlapping shipments can be simultaneously drawn onto the conveying belt 11 by this suction force. In FIGURE 4 two such shipments are illustrated, with the shipment 1' lying directly against belt 11 and shipment 1" adhering to the shipment 1' and having its leading edge protruding so far forwardly that it is also drawn against the belt by suction force. Therefore, at first both of the shipments 1' and 1" will simultaneously take part in the conveying motion of belt 11. However, when shipment 1" comes under the influence of the first vacuum stripper 18, it is gripped by this stripper so that only the shipment 1' is pushed forwardly from the suction port 10 toward the rollers 14 and 15. Thus, the critical point at which the required conveying friction is ambient between the shipment and the conveying belt is shifted farther and farther in the direction toward the trailing edge of the shipment.

When shipment 1' is gripped by the discharge rollers 14 and 15 it thereby frees the suction port 10 because its trailing edge leaves the vicinity of the port. Then, the shipment 1", which up to now has had shipment 1' interposed between it and the suction port, is drawn to the belt by suction force and pushed forwardly against the arresting force of strippers 18 and 19 and moved toward the conveying rollers 14 and 15. If, in addition to the second shipment 1", a third shipment is drawn to the suction port 10, after it is moved forwardly, this shipment is held back by the first stripper 18 while a shipment 1" is then held back by the second stripper 19. Dimensioning suction port 10 to be a length $b$ which satisfies the above-mentioned proposition assures that a maximum of only one shipment more can be drawn onto the belt at the suction port than can be held back by the stripping elements which are present.

With more particular reference to FIGURE 6, another embodiment is illustrated which has the same basic mode of operation as described in connection with FIGURES 1 through 5. Structural elements 3–10 and 12, 13, and 16–19 in FIGURE 6 are the same as those elements of the preceding figures and accordingly, the same reference numerals have been used in the drawings. This embodiment differs from the one described above in that the conveying section containing the suction conveying means and the separating section and having walls 5, 6 and 8 follows the feeding conveying path containing the horizontal conveying belt 3, but is disposed at an obtuse angle therewith. The wall 5 extends rearwardly back into the region of the feeding conveying path in the form of an extension 5'.

In order to obtain as advantageous a guiding of the shipments as possible in the apex of the obtuse angle, a rotating guide brush 23 is provided which is effective in this transient region. As shown in FIGURE 8 this brush extends from the outside through a slot 7' in the wall 7 and, as indicated in FIGURE 6, is driven to be effective in the conveying direction. The bristles 23' of this brush are guided between two disks 23″. It is preferable to arrange the drive for this guide brush to be independent from the drive of the feeding conveyor belt 3 so that the brush will continue to rotate when the conveying belt is stopped under certain conditions as will be described below. This is accomplished by using motor M to drive the brush.

In order to further improve the transit of the shipments, a deflection element is provided in the input region of the separating section proper. This deflection exerts a force upon the shipments fed by belt 3 in the direction of the suction conveying belt 24. A yieldably supported guide bar 25′, which is as light as possible may be used as such a deflection element (as shown in FIGURE 10). However, it is also possible and advantageous for this purpose to use a blowing element 25 (as shown in FIGURE 6) which may be connected to a source of superatmospheric air SA1.

In this embodiment according to FIGURE 6, the conveying belt 24, which is used as a suction conveying means, is provided with suction openings 24′ distributed over its entire surface as illustrated in FIGURE 9, although these perforations can not be seen from FIGURES 6 through 8.

In order to provide even greater certainty that the shipments 1 will move against the suction port 10 in the conveying section even when they are at first fed past the suction port spaced laterally therefrom, auxiliary pneumatic means are provided in the region of suction port 10 and preferably at a point disposed above this port. This pneumatic means includes suction openings 26 formed in the wall 8. These openings are connected with a suction chamber 27 provided behind this wall as shown in FIGURE 7. In order to supplement this measure, openings 28 are provided on the opposite side from openings 26 and in wall 5. Behind these openings is another air chamber 29 connected with a source of superatmospheric air SA2. In order to obtain the desired effectiveness of these suction and blow openings, they must be provided with air moving at a relatively high rate. The arrangement of these openings at a height above suction port 10 and conveying belt 24 has the advantage that the separation of those shipments of larger dimensions is facilitated. In order to further improve the adherence of shipments against suction port 10, further openings 28′ may be provided below the above-mentioned openings 28 in wall 5. Openings 28′ are connected to chamber 29′ which communicates with chamber 29 via opening 29″. However, the openings 28′ are provided with air at a lower superatmospheric pressure and/or lower rate of air flow than the openings 28 and the arrangement is constructed accordingly.

In the separator of the embodiment of FIGURE 6, rollers 14′ and 15′ form an independent conveying means and the conveying belts 16 and 17 of the discharging conveying path extend or run over their own separate guide or idler rollers 14″ and 15″. However, this difference in construction does not have any special functional effect. If it is desired that the shipments be transported farther one by one in such a manner that predetermined spaces are provided between individual shipments, then the conveying rollers 14′ and 15′ are preferably provided with a peripheral speed which is substantially greater than the speed of the suction conveying belt 24. If a similar mode of operation is desired in the embodiment of FIGURES 1 through 5, then the conveying rollers 14 and 15 are provided with a peripheral speed which is substantially greater than that of the belt 11. In this event it is also preferable to decrease the length of the suction port 10 in the conveying direction so that it is smaller than $10 \cdot d \cdot (n+1)$. In practical embodiments it has been shown that it is advantageous to drive the suction conveying element 24 or 11, respectively, with a greater conveying speed than the feeding path 3.

In a manner which is known per se, automatic control of the feeding conveying path in dependence upon the density of shipments in the separating section containing the suction conveying element can also be provided within the scope of the present invention. For this purpose a feeler element in the form of a feeler arm 30 is provided and is indicated schematically in FIGURE 6. The arm is in the form of a two-armed lever, pivotally mounted about a shaft 31 and the rearward or second lever arm actuates a switch 32 depending upon the density or number of shipments in the separating section. This switch arrangement is contained within an electric circuit for the drive of the conveying belt 3, so that the conveying belt is shut off when the separating section contains a predetermined density or number of shipments and is turned on again when this excess is removed. This arrangement is provided by a shipment density indicator 50 which controls a speed regulator 51, in turn connected to a motor 52 which drives a roller 53 which is the drive roller for belt 3.

In an exemplified embodiment of the invention distance $a$, in consideration of the shortest shipments to be processed, is 140 millimeters. The superatmospheric air effective at the openings 28 has a pressure according to a water-column of 5 millimeters, which is reduced for the openings 28′ to one half of this value. In the case the peripheral speed of the conveying rollers 14′ and 15′ is greater than the speed of the belt 24, the respective speeds may be 3 meters/second and 1, 2 meters/second. In the relationships $15.d.(n+1)$ and $10.d.(n+1)$, indicated above, the factors 15 and 10 respectively have been determined empirically.

It will be understood that the above description of the present invention is susceptible to various modifications, changes, and adaptations, and the same are intended to be comprehended within the meaning and range of equivalents of the appended claims.

What is claimed is:

1. A device for receiving irregularly arranged overlapping shipments and discharging them one at a time, comprising, in combination
   (a) feed conveying means;
   (b) a conveying section arranged to receive shipments from said feed conveying means and including
      (1) a separating section having an input depth which is substantially larger than its discharge depth, and having a side wall defining a suction port for connection with a low pressure chamber, and
      (2) suction conveying means disposed over the suction port and defining suction openings extending uniformly over the periphery thereof;
   (c) discharge conveying means for gripping the leading edges of respective shipments moved forwardly by the suction conveying means and moving them at uniform speed to a discharge outlet, said discharge conveying means being disposed at a distance from said suction port which is less than the length of the smallest shipments to be processed; and
   (d) at least one stripping means disposed between said suction port and said discharge conveying means for holding back overlapping shipments, the length $b$ of the suction port as measured in the conveying direction being so short that it approximately satisfies the condition $$b < 15 \cdot d \cdot (n+1)$$

where $d$ is the thickness of the thinnest shipments to be processed and $n$ is the number of the multiple shipments which can simultaneously be held back by the stripping elements.

2. A device as defined in claim 1 wherein the speed of the suction conveying means is greater than the conveying speed of the feed conveying means.

3. A device as defined in claim 2 wherein said discharge conveying means accelerates the respectively gripped shipments to a conveying speed which is substantially greater than the speed of the suction conveying means for providing a one-by-one discharge of the shipments.

4. A device as defined in claim 3 wherein the length of the suction port satisfies the condition $b<10 \cdot d \cdot (n+1)$.

5. A device as defined in claim 3 wherein said discharge conveying means includes a pair of conveying rollers running in opposite directions.

6. A device as defined in claim 5 wherein said discharge conveying means includes two conveying belts each disposed about a respective conveying roller which serves as a guide roller therefor.

7. A device as defined in claim 1 wherein said suction conveying means includes a perforated suction conveying belt.

8. A device as defined in claim 1 wherein said suction conveying means includes several conveying belts running side-by-side, said suction openings being formed by the mutual spacing between these belts.

9. A device as defined in claim 1 wherein said stripping means is a suction stripper yieldably biased by a small tension force toward said suction conveying means to contact the suction conveying means and/or the shipments conveyed thereby.

10. A device as defined in claim 9 wherein said stripping means includes at least one blowing stripper for supplementing the suction stripper, said blowing stripper being yieldably biased toward said suction conveying means.

11. A device as defined in claim 1 comprising deflection means in the input region of said separating section containing the suction conveying means for exerting a pressure force upon the arriving shipments in the direction toward the suction conveying means.

12. A device as defined in claim 11 wherein said deflection means includes a yieldably mounted guide bar.

13. A device as defined in claim 11 wherein said deflection means includes a blow element directed toward the suction conveying means and connected to a source of superatmospheric air.

14. A device as defined in claim 1 comprising means including pressure openings in the conveying section in the region of the suction port for providing a relatively large rate of air flow to exert a force in the direction toward the suction port upon the shipments present in the conveying section.

15. A device as defined in claim 14 wherein said pressure openings are, with respect to their height, above the suction port.

16. A device as defined in claim 1 wherein the conveying section containing the suction conveying means joins the feed conveying means at an obtuse angle.

17. A device as defined in claim 16 comprising a guide brush in the transit region between the feed conveying means and the conveying section which is effective from the outside, said brush rotating in correspondence with the conveying direction.

18. A device as defined in claim 17 comprising feeler means for monitoring the shipments present in the conveying section containing the suction conveying means and means for influencing the conveying speed of the feed conveying means in dependence upon the result of this monitoring.

19. A device as defined in claim 17 wherein the drive of the guide brush is independent from the drive of the feed conveying means.

20. In a device for further transporting one at a time shipments which have been irregularly fed from a conveying path which conveyed these shipments on edge in which a separating section follows a feed conveying path, the input breadth of this section being substantially larger than its discharge breadth and in whose one side wall there is a suction port connected with a low-pressure chamber, in front of which suction port an endless suction conveying means is disposed, the improvement that: the suction openings of the suction conveying means running over the suction port extend uniformly over its entire periphery; discharge conveying means are provided for gripping the respective shipments pushed forward by the suction conveying means at their leading edge and passing them on, with uniform speed, to a discharge outlet, said discharge conveying means being disposed at a distance $a$ from the suction port, distance $a$ being smaller than the length of the smallest shipments to be processed; and at least one stripping element is provided in the region between the suction port and said discharge conveying means for holding back multiple shipments, the length $b$ of the suction port as measured in the conveying direction being so short that it approximately satisfies the condition $$b<15 \cdot d \cdot (n+1)$$

where $d$ is the thickness of the thinnest shipments to be processed and $n$ is the number of the multiple shipments which can simultaneously be held back by the stripping elements.

References Cited in the file of this patent

UNITED STATES PATENTS

| | | |
|---|---|---|
| 2,004,882 | Vorms | June 11, 1935 |
| 2,555,325 | Doane | June 5, 1951 |
| 2,956,804 | Ridenour | Oct. 18, 1960 |
| 3,026,109 | Pfeffer | Mar. 20, 1962 |